(12) United States Patent
Xie et al.

(10) Patent No.: US 6,704,469 B1
(45) Date of Patent: Mar. 9, 2004

(54) POLARIZATION BEAM COMBINER/SPLITTER

(75) Inventors: Ping Xie, San Jose, CA (US); Tim Day, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 122 days.

(21) Appl. No.: 09/660,258

(22) Filed: Sep. 12, 2000

(51) Int. Cl.⁷ ............................. G02B 6/00; G02B 5/30
(52) U.S. Cl. ............................. 385/11; 385/47; 398/65
(58) Field of Search ............................. 385/11, 16, 18, 385/24, 31, 33, 34–36, 47; 359/115, 122, 127–129, 131; 398/65, 106, 113, 118–120, 122

(56) References Cited

U.S. PATENT DOCUMENTS

| | | | |
|---|---|---|---|
| 4,415,233 A | * 11/1983 | Itoh et al. | 359/582 |
| 5,056,887 A | * 10/1991 | Ohshima | 385/36 |
| 5,408,555 A | 4/1995 | Fielding et al. | 385/43 |
| 5,491,764 A | 2/1996 | Hu et al. | 385/24 |
| 5,809,190 A | 9/1998 | Chen | 395/43 |
| 5,912,762 A | * 6/1999 | Li et al. | 359/352 |
| 5,923,470 A | * 7/1999 | Pan et al. | 359/495 |
| 5,956,441 A | 9/1999 | Fairchild et al. | 385/27 |
| 6,014,256 A | * 1/2000 | Cheng | 385/11 |
| 6,181,850 B1 | 1/2001 | Nakamura et al. | 359/124 |
| 6,282,025 B1 | * 8/2001 | Huang et al. | 385/11 |
| 6,295,393 B1 | * 9/2001 | Naganuma | 385/11 |
| 6,339,661 B1 | * 1/2002 | Kokkelink et al. | 385/11 |
| 6,384,974 B1 | * 5/2002 | Joubert et al. | 359/498 |
| 6,411,749 B2 | * 6/2002 | Teng et al. | 385/11 |
| 6,563,982 B1 | * 5/2003 | Xie et al. | 385/33 |

FOREIGN PATENT DOCUMENTS

JP  06059124 A  * 3/1994 ............ G02B/5/30

OTHER PUBLICATIONS

Melles Griot, "The Practical Application of Light", 1999, pp. 11.2 and 12.18.*
Electronics Letters—An International Publication, Mar. 15, 1990, vol. 26, No. 6.

* cited by examiner

Primary Examiner—Akm Enayet Ullah
Assistant Examiner—Michelle R. Connelly-Cushwa
(74) Attorney, Agent, or Firm—Workman Nydegger

(57) ABSTRACT

An optical device according to the present invention is disclosed which comprises a first optical fiber and a second optical fiber disposed adjacent to each other, the first fiber being optically configured to receive incident light; a polarization dependent reflector having a preferred axis; a common lens configured to optically couple the first and second fibers to the polarization dependent reflector; and a third optical fiber coupled to the polarization dependent reflector through a second lens. The device may be characterized in that the optical device is aligned such that incident light launched into the polarization dependent reflector is provided to the second fiber at both a predetermined angle and a predetermined polarization; and such that incident light launched into the polarization dependent reflector is launched into the third fiber at a predetermined polarization.

12 Claims, 3 Drawing Sheets

Present Invention

Present Invention

POLARIZATION BEAM COMBINER/SPLITTER

BACKGROUND OF THE INVENTION

1. Field of the Invention

The present invention relates generally to fiber optics. In particular, the present invention relates to polarization beam splitters and combiners.

2. The Prior Art

BACKGROUND

In the field of fiber optics, one of the most valuable properties of light is the phenomenon of polarization. Light is described as a transverse wave when travelling through a medium such as glass, air or vacuum, whereby by the electric and magnetic fields which comprise the light oscillate in a plane perpendicular to the direction in which the light is travelling. Many factors may influence the polarization of light, including reflections from surfaces, external magnetic fields, and in particular, stresses in the transmitting media.

One application that results from the polarization of light or laser energy is the ability to combine multiple energy sources for a higher total power in an application known as polarization multiplexing. Polarization multiplexing results in higher total output power as well as lower polarization-dependent gain from an amplifier such as a Raman or EDFA type amplifier. When performing polarization multiplexing, typically a polarization beam splitter/combiner (PBS) is used.

A PBS is a device which either combines or splits multiple light sources according to the polarization direction of the light. A typical PBS comprises a common port and two splitting ports or combining ports. The common port is usually comprises a SM fiber and the two splitting or combining ports usually comprise PM fibers. In some special cases, the common port may be a PM fiber and the splitting or combining ports may be SM fibers. When a polarization beam splitting function is performed, light comes from the common port will be split into two orthogonal polarization components, which are subsequently received by the two combining or splitting ports.

As is known by those skilled in the art, it is usually preferable to have the slow axis or fast axis of receiving PM fibers match the splitted light polarization directions to minimize insertion losses. When a polarization beam combining function is performed, light coming from the two combining ports is linearly polarized orthogonal to each other, combined by a polarization beam splitter/combiner prism, and received by the common port. When the polarization direction of light coming from the combining port is not aligned with its respective direction from the polarization splitting operation, only the component that along the splitting polarization direction will be directed to the common port, an the other orthogonal component will be directed to a different undesired optical path resulting a high combining loss. For example, a typical pump laser for EDFA or Raman amplifier usually has a PM fiber output and the laser light coming out of the PM fiber is usually linearly polarized with its polarization direction being along the slow axis of the PM fiber. When the light coming out of the PM fiber is incident upon the polarization beam splitter/combiner, it is essential to have its polarization direction match the principal polarization axis of the polarization beam splitter/combiner to avoid any beam splitting which may result in substantial insertion loss.

Thus it is a challenge to manufacture a polarization beam splitter/combiner with its principal polarization axis matching a preferred orientation of PM fiber, such as the slow or fast axis.

FIG. 1 shows a functional block diagram of a prior art PBS. The following disclosure will discuss PBS 100 in the splitter mode of operation, but the process may be reversed for a combiner operation.

PBS 100 includes a fiber 102 configured to receive incident light launched into PBS 100. Fiber 102 is optically coupled to a first lens 104 configured to pass incident light to a prism 108. Prism 108 may comprise a polarizing beamsplitter cube, a Glan-Foucault prism, or other suitable prism known in the art.

Prism 108 is configured to transmit light of a first polarization direction, generally known as the P direction, through a second lens 112 on to a fiber 114. Fiber 114 may comprise a polarization maintaining fiber (PM) fiber or SM fiber standard in the art. Prism 108 is also configured to reflect light of a second polarization known as S polarization through a third lens 118 to a fiber 120. Fiber 120 may be composed of either a PM fiber or a SM fiber.

In operation, incident light having an arbitrary polarization emitting from fiber 102 is coupled through a first lens 104 onto the prism 108. The arbitrary polarization direction is shown in FIG. 1 as light of a first polarization being represented by an arrow, and light of a second polarization being represented by an X. As is known by those skilled in the art, light with an arbitrary polarization direction usually has polarization components in both S and P directions. When the incident light 122 passes through the prism 108, light of a first polarization (P polarization) is transmitted through a second lens 112 to a fiber 114. Light of a second polarization (S polarization) is reflected in prism 108 through a third lens 118 on a fiber 120.

In the case where fibers 114 or 120 are PM fibers, fiber 114, or fiber 114 and lens 112 together, may be rotated with respect to the axis 110 to align the slow axis or fast axis of PM fiber 114 or a preferred orientation to the polarization direction P. Similarly, fiber 120, or fiber 120 and third lens 118 together, may be rotated with respect to the axis 116 to align the slow axis or fast axis of PM fiber 120 or a preferred orientation to the polarization direction S.

While the PBS of FIG. 1 works for its intended purpose, certain disadvantages have been noted. For example, the configuration of FIG. 1 results in a three-port apparatus utilizing three lenses. This three-port, three lens configuration results in a relatively large size. In addition, it increases manufacturing and packaging complexity since three independent ports have to be aligned and packaged.

Therefore, there is a need for a smaller sized polarization beam splitter and combiner with a reduced number of components.

Furthermore, there is a need for a polarization beam splitter/combiner that is smaller than those of the prior art.

Additionally, prior art devices typically place two PM fiber adjacent to each other and a SM fiber on the opposite end to achieve a compact package. However, this design requires precise alignment of each PM slow axis with respect to each other, polarization direction matching of fiber to each light component can not be independently adjusted. Thus performance is poor and yield is low.

Hence there is a need to achieve a compact package while providing independent adjustment of polarization direction matching.

BRIEF DESCRIPTION OF THE INVENTION

The invention satisfies the above needs. The present invention relates generally to fiber optics. In particular, the present invention relates to polarization beam combiners and splitters.

A method for producing an optical device according to the present invention is disclosed which comprises providing a first fiber; optically coupling the first fiber to a common lens, and optically coupling the common lens to a polarization dependent reflector; optically coupling a second fiber to the polarization dependent reflector through the common lens, the first and second fibers being disposed adjacent to one another; optically coupling a third fiber to the polarization dependent reflector through a second lens; and aligning the device such that transmitted light is provided to the first and second optical fibers through the common lens, and the reflected light is provided to the third optical fiber through the second lens.

An optical device according to the present invention is disclosed which comprises a first optical fiber and a second optical fiber disposed adjacent to each other, the first fiber being optically configured to receive incident light; a polarization dependent reflector having a preferred axis; a common lens configured to optically couple the first and second fibers to the polarization dependent reflector; and a third optical fiber coupled to the polarization dependent reflector through a second lens. The device may be characterized in that the optical device is aligned such that incident light launched into the polarization dependent reflector is provided to the second fiber at both a predetermined angle and a predetermined polarization direction; and such that incident light launched into the polarization dependent reflector is launched into the third fiber at a predetermined polarization direction.

Various aspects of the present invention are disclosed, including where the first and third optical fibers are disposed on opposite sides of the polarization dependent reflector along the preferred axis of the polarization dependent reflector. A further aspect is disclosed wherein the first or said second optical fibers comprise polarization maintaining fibers. Yet another aspect is disclosed wherein the predetermined angle comprises an angle between approximately 2° and approximately 5°.

Further aspects of the present invention are disclosed wherein the predetermined polarization of the reflected light or transmitted light substantially overlaps the slow or fast axis of the second or third optical fiber respectively.

BRIEF DESCRIPTION OF THE DRAWING FIGURES

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
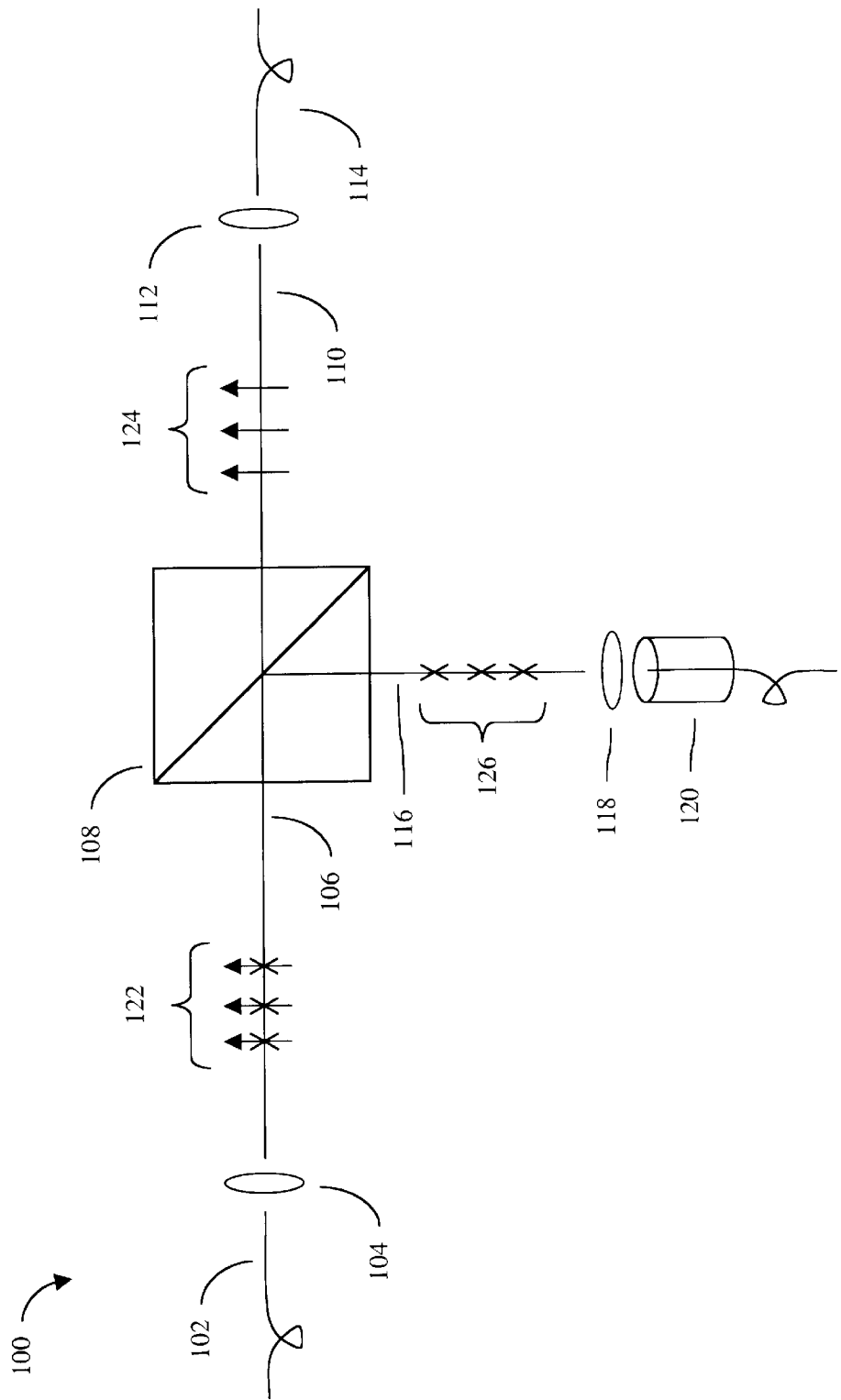
FIG. 1 is a diagram of a prior art optical fiber.
Figure 2:
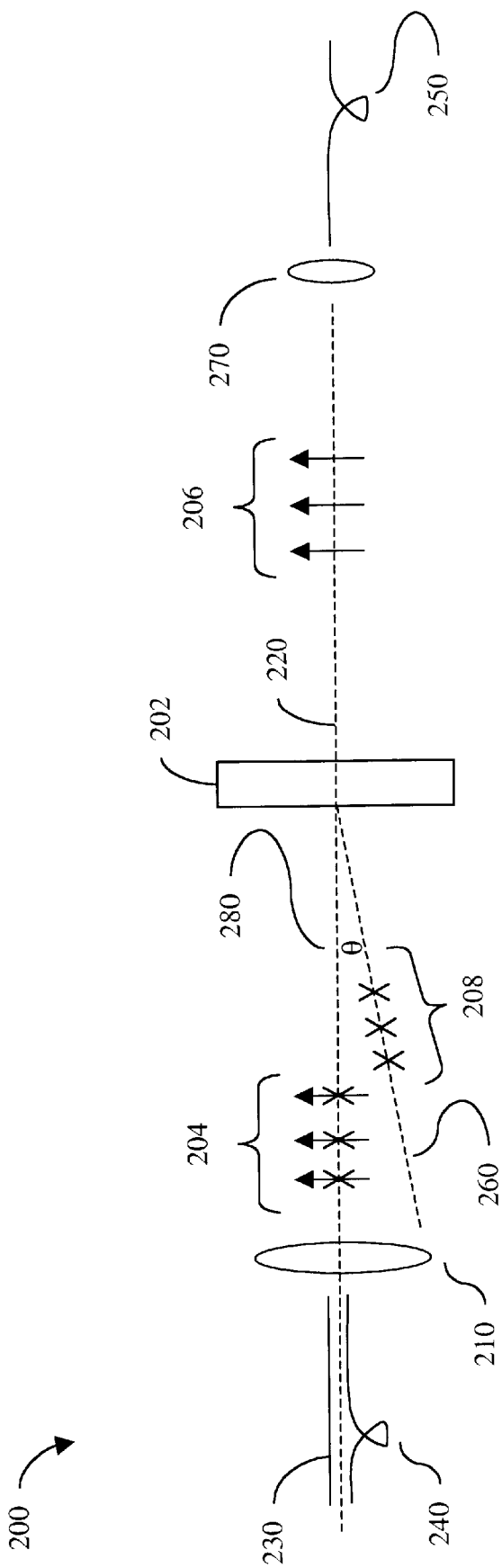
FIG. 2 is a functional diagram of an improved polarization beam splitter/combiner according to the present invention.

Referring now to FIG. 2, a functional diagram of one embodiment of the present invention is shown. PBS 200 of FIG. 2 includes a first fiber 230 and a second fiber 240. In an exemplary non-limiting embodiment of the present invention, the two fibers 230 and 240 are disposed adjacent to each other and optically coupled through a common lens 210. It is contemplated that the two fiber 230 and 240 may be SM fibers, PM fibers of a combination of both.

Common lens 210 is optically configured to transmit the incident light launched from first fiber 230 along a central axis 220. Central axis 220 also defines an axis about which the present invention may be oriented.

In an exemplary non-limiting embodiment, a polarization dependent reflector 202 is disposed along central axis 220. Polarization dependent reflector 202 is configured to transmit one polarization component 206 along central axis 220, through a second lens 270 and to a third fiber 250.

The polarization dependent reflector 202 may comprise a thin film deposit on a substrate such as manufactured by Nanooptics, or a polarization beam splitter cube standard in the art with a high reflection coating deposited on the bottom surface. The polarization dependent reflector utilized in the present invention should have a preferred axis allowing for light with a polarization direction along the axis to be transmitted therethrough.

Figure 3A:
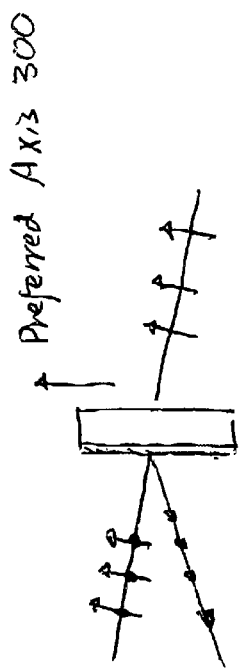
FIGS. 3A–3B are diagrams illustrating polarization dependent reflectors.
Figure 3B:
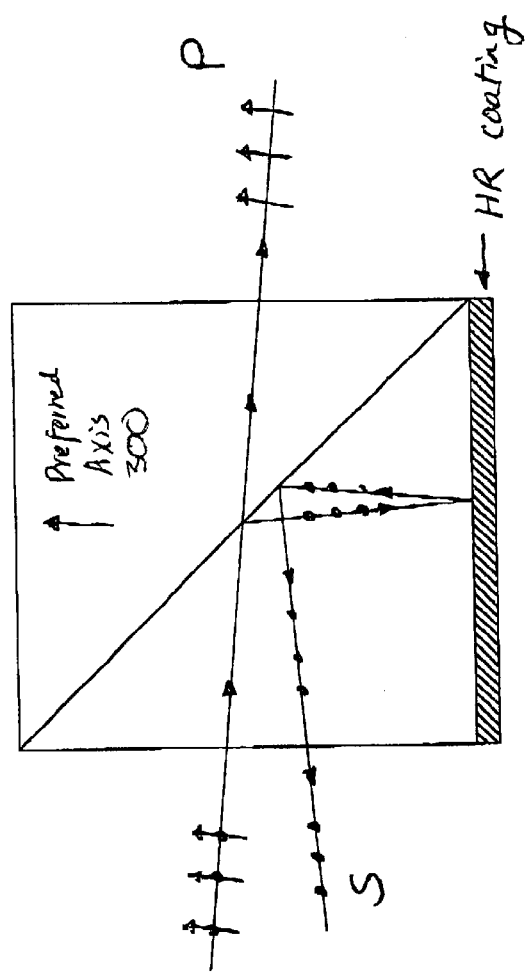

FIGS. 3A and 3B are diagrams of polarization dependent reflectors suitable for use in the present invention. FIG. 3A is a diagram of polarization dependent reflector including a thin film deposit on a substrate and having a preferred axis 300. FIG. 3B is a diagram of a polarization dependent reflector with a high reflection coating deposited on the bottom surface and having a preferred axis 300.

In an exemplary non-limiting embodiment of the present invention, the polarization dependent reflector (PDR) has a preferred polarization axis. Light signals will be transmitted through the PDR if its polarization direction is along the preferred axis 300 or be reflected if its polarization direction is perpendicular to axis 300.

Additionally, polarization dependent reflector 202 is optically configured to reflect another orthogonal polarization component 208 along path 260 at an angle defined by θ, through common lens 210 and through second fiber 240. The angle is determined by the angle of incidence of the light signal on PDR. In an exemplary non-limiting embodiment of the present invention, angle θ is approximately twice the angle of incidence. In preferred embodiments of the present invention, angle θ may range between 0 and 90 degrees, preferably between 0 and 10 degrees, and more preferably between 0 and 5 degrees.

Referring now to a method for aligning a PBS configured according to the present invention, polarization dependent reflector 202 may be aligned with respect to axis 220. In an exemplary non-limiting embodiment, axis 220 may be defined above a bisector line between the incident light and the reflected light.

Polarization dependent reflector 202 may be rotated to align the polarization of the transmitted and reflected light. In an exemplary non-limiting embodiment, polarization dependent reflector 202 is rotated with respect to an axis that is substantially close to axis 220. In yet another exemplary non-limiting embodiment, polarization dependent reflector 202 is rotated with respect to axis 220 to direct a portion or all light signal from $1^{st}$ fiber towards the $2^{nd}$ fiber which is placed adjacent to the $1^{st}$ fiber.

As polarization dependent reflector 202 is rotated according to the present invention, the polarization direction of the reflected light 208 may thus be aligned to substantially match a preferred direction onto the second fiber 240. In an exemplary non-limiting embodiment, the polarization direction of the reflected light 208 is aligned to substantially match the slow axis or fast axis of second fiber 240.

As the polarization dependent reflector 202 is rotated, the transmitting light 206 polarization direction is also rotated. When the polarization dependent reflector 202 has been rotated and fixed in position to match the reflection polarization direction 260 to a preferred polarization direction onto the second fiber 240 as described above, the transmitting polarization direction may be determined. In an exemplary non-limiting embodiment, this direction is orthogonal to the reflecting polarization direction.

Finally, third fiber 250 alone, or third fiber 250 along with second lens 270, may be rotated to allow the transmitted light polarization direction to match a preferred direction on the third fiber 250. In an exemplary non-limiting embodiment, the transmitted light polarization direction may correspond to either the slow or fast axis of third fiber 250.

Referring now to the physical advantages of the present invention, a PBS according to the present invention as described above and indicated in FIG. 2 results in a package size which is very small when compared to prior art devices. For example, the coaxial type of package illustrated herein can result in a finished product having an approximate size on the order of Φ5.5×35 mm. By way of comparison, prior art products currently available on the market today have dimensions on the order of 25×25×25 mm, significantly larger than the present invention.

Additional advantages of the present invention result from the fact that each polarization direction can be independently controlled in a PBS according to the present invention. For example, reflected light polarization direction can be adjusted by rotating PDR 202 with respect to axis 220 to match a preferred orientation (slow or fast axis) of the second fiber, and the third fiber can then be rotated with respect to axis 220 to match its preferred orientation (slow or fast axis) to the polarization direction of transmitted light. This independent control of polarization direction matching to a preferred axis of fiber in the present invention provides manufacturing flexibility, and improves both yield and throughput.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An optical device comprising:
   a first optical fiber that is optically configured to receive a light signal;
   a second optical fiber adjacent to the first optical fiber, wherein the second optical fiber has a particular orientation;
   a polarization dependent reflector having a thin film disposed thereon and that is optically coupled with the first optical fiber and the second optical fiber with at least one lens, wherein the polarization dependent reflector can be rotated such that a particular polarization of the light signal reflected by the polarization dependent reflector substantially matches the particular orientation of the second optical fiber;
   a third optical fiber that is rotated such that a certain orientation of the third optical fiber substantially matches a polarization of the light signal that passes through the polarization dependent reflector.

2. An optical device as defined in claim 1, wherein the second optical fiber is a single mode fiber or a polarization maintaining fiber and wherein the third optical fiber is a single mode fiber or a polarization maintaining fiber.

3. An optical device as defined in claim 1, wherein the third optical fiber is disposed on an opposite side of the polarization dependent reflector than the first optical fiber and the second optical fiber.

4. An optical device as defined in claim 1, wherein said polarization dependent reflector comprises a polarization beam splitter cube.

5. An optical device as defined in claim 4, wherein the polarization beam splitter cube has a high reflection coating on a bottom surface.

6. An optical device as defined in claim 1, wherein the particular polarization of the light signal reflected by the thin film substantially overlaps either a slow axis or a fast axis of the second optical fiber and wherein the light signal the polarization of the light signal that passes through the thin film substantially overlaps either a slow axis or a fast axis of the third optical fiber.

7. An optical device comprising:
   a first optical fiber that is optically configured to receive a light signal;
   a polarization maintaining second optical fiber adjacent to the first optical fiber;
   a polarization dependent reflector that has a thin film disposed thereon and that is optically coupled with the first optical fiber and the second optical fiber, wherein the polarization dependent reflector can be rotated such that a particular polarization of the light signal reflected by the thin film substantially overlaps either a slow axis or a fast axis of the second optical fiber;

a polarization maintaining third optical fiber that is rotated such that a polarization of the light signal that passes through the thin film substantially overlaps either a slow axis or a fast axis of the third optical fiber.

8. An optical device as defined in claim 7, wherein the third optical fiber is disposed on an opposite side of the polarization dependent reflector than the first optical fiber and the second optical fiber.

9. An optical device as defined in claim 7, wherein the polarization dependent reflector has a preferred axis.

10. A method for forming a polarization beam splitter/combiner device, the method comprising:

optically coupling a first optical fiber to a first side of polarization dependent reflector that has a thin film dispose on a substrate;

optically coupling a polarization maintaining second optical fiber to the first side polarization dependent reflector, wherein the second optical fiber is disposed adjacent the first optical fiber;

optically coupling a polarization maintaining third optical fiber to a second side of the polarization dependent reflector;

rotating the polarization dependent reflector such that a polarization of light reflected by the polarization dependent reflector substantially matches a particular direction of the second optical fiber; and rotating the third optical fiber such that a polarization of light transmitted through the polarization dependent reflector substantially matches a particular direction of the third optical fiber.

11. A method as defined in claim 10, further comprising rotating the polarization dependent reflector until the polarization of the light reflected by the polarization dependent reflector substantially matches either a fast axis or a slow axis of the second optical fiber.

12. A method as defined in claim 10, further comprising rotating the third optical fiber until the polarization of the light transmitted by the polarization dependent reflector substantially matches either a fast axis or a slow axis of the third optical fiber.

* * * * *